(12) United States Patent
Franklin et al.

(10) Patent No.: US 8,560,445 B2
(45) Date of Patent: Oct. 15, 2013

(54) METHODS AND SYSTEMS FOR MANAGING TRANSACTION CARD ACCOUNTS

(75) Inventors: Glennon Franklin, Fairfield, CT (US); Edmond Eger, Rye, NY (US)

(73) Assignee: Citicorp Credit Services, Inc., Long Island City, NY (US)

( * ) Notice: Subject to any disclaimer, the term of this patent is extended or adjusted under 35 U.S.C. 154(b) by 1285 days.

(21) Appl. No.: 11/580,770

(22) Filed: Oct. 13, 2006

(65) Prior Publication Data
US 2007/0100747 A1    May 3, 2007

Related U.S. Application Data

(60) Provisional application No. 60/726,272, filed on Oct. 13, 2005.

(51) Int. Cl.
*G06Q 40/00* (2012.01)

(52) U.S. Cl.
USPC .............................................. 705/40; 705/39

(58) Field of Classification Search
USPC .............................................. 705/39, 36, 40
See application file for complete search history.

(56) References Cited

U.S. PATENT DOCUMENTS

| 6,681,988 B2 * | 1/2004 | Stack et al. | 235/380 |
| 2003/0033245 A1 * | 2/2003 | Kahr | 705/39 |

* cited by examiner

*Primary Examiner* — Ojo O Oyebisi
(74) *Attorney, Agent, or Firm* — John M. Harrington; Johnson, Marcou & Isaacs, LLC (57) ABSTRACT

A method and system for managing transaction card accounts involves providing a customer a transaction card account by a financial institution against which the customer can charge predetermined types of transactions during predefined account statement periods and sending a statement of charges against the account to the customer at an end of each account statement period specifying a due date, after which a predefined late fee is assessed on the account if the statement is not paid. However, the late fee is automatically waived on the account within specified products if the customer makes a purchase or secures a cash advance during the account statement period for which the payment is due. Further, a voice response unit of the financial institution gives the customer a first menu option to opt out of a voice response unit scripted call and speak directly to a live representative about the account at any time during the call.

13 Claims, 6 Drawing Sheets

Fig. 5A  Continues at (A) in FIG.

FIG. 5B

METHODS AND SYSTEMS FOR MANAGING TRANSACTION CARD ACCOUNTS

PRIORITY APPLICATION

This application claims the benefit of U.S. Provisional Application No. 60/726,272 filed Oct. 13, 2005, entitled "METHODS AND SYSTEMS FOR MANAGING TRANSACTION CARD ACCOUNTS" and incorporated herein by this reference

FIELD OF THE INVENTION

The present invention relates generally to the field of transaction cards, and more particularly to methods and systems for managing transaction card accounts.

BACKGROUND OF THE INVENTION

On-going efforts by financial institutions, such as banks, to provide sustainable, competitive differentiation for their transaction cards in the US consumer credit card marketplace include, for example, financial analysis of their businesses and market research to ascertain where there might be opportunities to innovate with one or more new credit card products. As a result of such analysis and research, it has been determined that there are currently certain issues that key segments of consumers have with existing credit card industry practices.

Such issues include, but are not limited to, the way in which late fees are assessed in conjunction with the timing of the receipt of an ordinary monthly transaction card account payment, the way customer service representatives are accessed when a card holder telephones a card issuer, and the manner in which credit card issuers communicate with prospective and existing customers through the ordinary course of business in marketing and customer communication materials.

Specifically, the findings of such analysis and research indicate a high level of dissatisfaction with the application of late fees immediately following the due date for which a transaction card account payment falls due, the degree of difficulty encountered by a card holder in navigating automated telephone response units in order to connect with a live representative, and communications to prospective and existing customers from card issuers that were perceived as overwhelming, confusing or difficult to decipher for their true intent in terms of the offer content and the terms and conditions of the account associated with the offer.

SUMMARY OF THE INVENTION

It is a feature and advantage of the present invention to provide methods and systems for managing transaction card accounts that improve the customer experience by addressing key sources of customer dissatisfaction and offering clear, straightforward communications.

To achieve the stated and other features, advantages and objects, embodiments of the present invention employ computer hardware and software, including, without limitation, instructions embodied in program code encoded on machine readable medium, to provide methods and systems for managing transaction card accounts in which, for example, late fees are automatically waived on accounts within specified products when a customer makes a purchase or secures a cash advance during the billing period for which the payment is due and the customer is given an option to opt out of a voice response unit (VRU) scripted call and speak directly to a live representative about the account at any time during the call.

According to embodiments of the invention, a customer is provided a transaction card account, such as a basic card account, a rewards card account, or a cash card account, by a financial institution against which the customer can charge predetermined types of transactions, such as purchase and cash advance transactions, during predefined account statement periods. At the end of each account statement period, the customer is provided a statement of charges against the account specifying a due date. If the statement is not paid by the specified due date, a predefined late fee is conditionally assessed on the account. However, the assessed late fee is waived if the customer made a charge against the account according to predefined parameters, such as a charge for a purchase or a cash advance, during a predetermined period of time, such as during the statement period for which the payment is due.

In embodiments of the invention, the determination of whether or not the charge for the purchase or cash advance transaction was made during the statement period is based on the date on which the purchase or cash advance transaction was posted to the account rather than on the date on which the purchase or cash advance transaction was made. In other embodiments of the invention, in the event that a late fee is waived, an amount of the waived late fee is displayed for the customer on a succeeding statement of charges against the account which specifies that the late fee was waived. In further embodiments of the invention, certain transactions, such as balance transfers, are excluded from the determination of whether or not the charge for the purchase or the cash advance transaction was made during the statement period. In still further embodiments of the invention, no limitation is imposed on an annual basis or otherwise on the number or amount of waived late fees.

In a direct-to-representative aspect of embodiments of the invention, the financial institution provides a voice response unit in a customer service operational area within the financial institution that allows the customer an option to opt out of a voice response unit scripted call and speak directly to a customer service representative about the account at any time during the call. In this aspect, the voice response unit is provided with a menu in which the first menu option is to route the customer to the customer service representative. Further, in this aspect, the customer can opt out of the voice response unit scripted call and speak directly to the customer service representative about the account by pressing "0" at any time during the call, in which case the customer will be connected with the next available customer service representative.

In further embodiments of the direct-to-representative aspect, the customer is prompted to enter the customer's account number into the voice response unit, and when received, the account number is automatically passed from the voice response unit to the customer service representative when the customer opts out of the voice response unit scripted call to speak direct to the customer service representative.

Additional objects, advantages and novel features of the invention will be set forth in part in the description which follows, and in part will become more apparent to those skilled in the art upon examination of the following, or may be learned from practice of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Embodiments of the invention involve, for example, implementation of a systematic process through the information technology infrastructure of a financial institution, such as a bank, to automatically waive late fees on accounts within specified products where a customer has made a purchase or secured a cash advance in the billing period for which the payment was due. Otherwise, the financial institution maintains, for example, all existing risk management practices associated with those accounts. Thus, in an embodiment of the invention, the only thing that is modified in the account is the application of the late fee, but that application is handled through a systematic process.

Another aspect of the invention involves working with the customer service operational area within a financial institution to modify the programming of the financial institution's voice response unit (VRU) to enable a caller, for example, to press "0" at any time and be connected with the next available live representative. In addition to the systematic implementation, policies and procedures within customer service of the financial institution are modified to ensure that the customer experience associated with being able to press "0" for connection with the next available live representative is satisfactorily supported by maintenance of the financial institution's average speed of answer and other service quality indications or metrics so that implementing this process does not put the customer at a disadvantage through an unduly long "on-hold" time or through some other trade-off in the service experience.

Further aspects of the invention involve, for example, communication by the financial institution to its customers in a manner that clearly disseminates the terms and conditions of the late fee waiver without excessive use of legal disclosures and providing the simplest possible execution of marketing and customer communications.

In an embodiment of the invention, on an ongoing basis, the financial institution uses feedback from existing and prospective customers through the course of market research, through interaction in the financial institution's customer service unit, and through any other suitable means established by the financial institution to allow its customers to provide it with feedback on their experiences with implementation of embodiments of the invention in order to continue to evolve and innovate the capabilities associated with embodiments of the invention and the features and benefits experienced by customers in having embodiments of the invention available.

Any number of different types of transaction card accounts may be associated with embodiments of the invention, such as a basic card account, a rewards card account, and a cash card account, all of which share the late fee waiver functionality. The way in which the late fee waiver functionality works systematically, for example, is that at the time a billing period closes (at which time the financial institution is systematically preparing the monthly billing statement), the transactions that have occurred on the account during that billing period are examined. If such examination discloses at least one instance of either an external purchase, or if at least one cash advance is found, and if the payment for that billing period is not received by the due date printed on the statement for that billing cycle, no late fee is imposed by the financial institution.

More particularly, as an example of the specific execution of the late fee waiver functionality, the financial institution enters a transaction item on the statement which specifies that the late fee is waived, setting out a dollar amount of what the late fee would have been had it been applied, but recording a zero dollar amount. Excluded transactions are balance transfers and the purchase of fee or product-related services provided by the financial institution. Thus, if a customer has a balance transfer on his or her account in a given billing period and nothing else, and the payment is not received by the due date, a late fee will be applied to the account. On the other hand, if the customer has a purchase at any merchant during the billing period, and the payment is not received by the due date, the late fee will be waived.

To clarify the distinction between a financial institution-based purchase and an external purchase, embodiments of the invention employ merchant category codes and a credit card payment network to determine and define the type of purchase transaction that has occurred. The financial institution qualifies the purchase on the basis of the date on which the transaction posts to the account rather than on the date on which the transaction was made. The reason for this is that there may be a delay between the time the transaction occurred and the date on which it is posted to the account. Therefore, the posting date is the only date of which the financial institution is duly aware that the transaction has been made.

Embodiments of the invention provide functionality, for example, to waive late fees, as well as over-the-limit and/or check return fees according to predefined parameters. For example, a late payment fee is waived if at least one condition is met, such as a predetermined number of purchase transactions or a purchase transaction totaling a predetermined amount occurring in the statement cycle in which the late fee is being assessed. Assume, for example, that a customer's statement cycles (i.e., is billed) on or about the fifteenth of each month, and that the customer's July statement with an August ninth payment due date is not paid by the due date. In embodiments of the invention, if the customer makes at least one purchase transaction between July sixteenth and August fifteenth which is posted in the statement that cycles on August fifteenth, the late fee is waived in the statement printed on August fifteenth because the customer made at least one purchase transaction before the billing date of August fifteenth. The late fees are automatically waived without the necessity of any customer action, which occurs in the same statement cycle in which the fees are to be charged.

Assume further a number of different example scenarios in each of which a customer's current statement closing date is the fourth of April and his or her current payment due date is the twenty-seventh of April. In a first such scenario, if the customer makes payment on the twenty-fourth of April, the payment is on time and no late fee is imposed. In a second such scenario, if the customer makes payment on the twenty-ninth of April (i.e., after the due date) but also has a new purchase on the seventh of April and a purchase/cash advance on the nineteenth of April (i.e., within the current statement cycle), a late fee is incurred but automatically waived.

In a third such scenario, if the customer makes payment on the twenty-ninth of April (i.e., after the due date) and has a new purchase/cash advance on the first day of the May (i.e., within the current statement cycle), a late fee is incurred but is likewise waived. In a fourth such scenario, if the customer makes payment on the eighth of May (i.e., after the due date and after the beginning of a succeeding statement cycle) but also has a new purchase on the thirtieth of April (i.e., within the current statement cycle), a late fee is incurred but automatically waived because of the new purchase and/or cash advance. Finally, in a fifth such scenario, if the customer makes payment on the twenty-ninth of April (i.e., after the due date) but also has a new purchase on the eighth of May (i.e., within the succeeding statement cycle), a late fee is incurred and assessed.

It is noted, however, that according to embodiments of the invention, the foregoing conditions of a predetermined number of purchase transactions, or a purchase transaction totaling a predetermined amount in the statement cycle, are not required for waiver of over-the-credit-limit and check return fees. The check return fee is waived when it is assessed.

In embodiments of the invention, a statement descriptor is included on customers' account statements to show customers that late fees were waived. For example, three descriptors are utilized similar to annual fee descriptor used by other products, such as [Card Description] "XXXX fee waived mm/yy to mm/yy—$0.00". In addition, the customer can be provided a statement message informing him or her that the fee or fees have been waived. A communication in the form of a letter can also be sent to the customer advising him or her that the fees have been waived, but if more than one fee is waived in one statement cycle, only one letter need be sent. Finally, embodiments of the invention do not impose, for example, annual limits of waiver of fees, and fees will continue to be waived for as long as the customer meets the predefined conditions.

Figure 1:
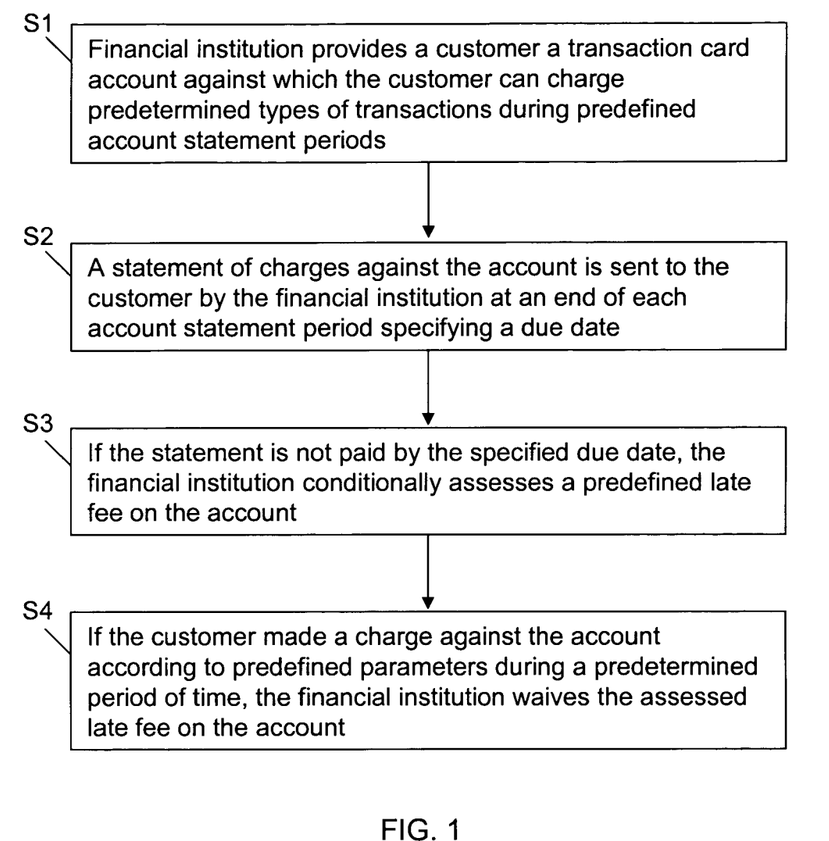
FIG. 1 is a flow chart that illustrates an example of the process of waiving a late fee for embodiments of the invention.
Figure 2:
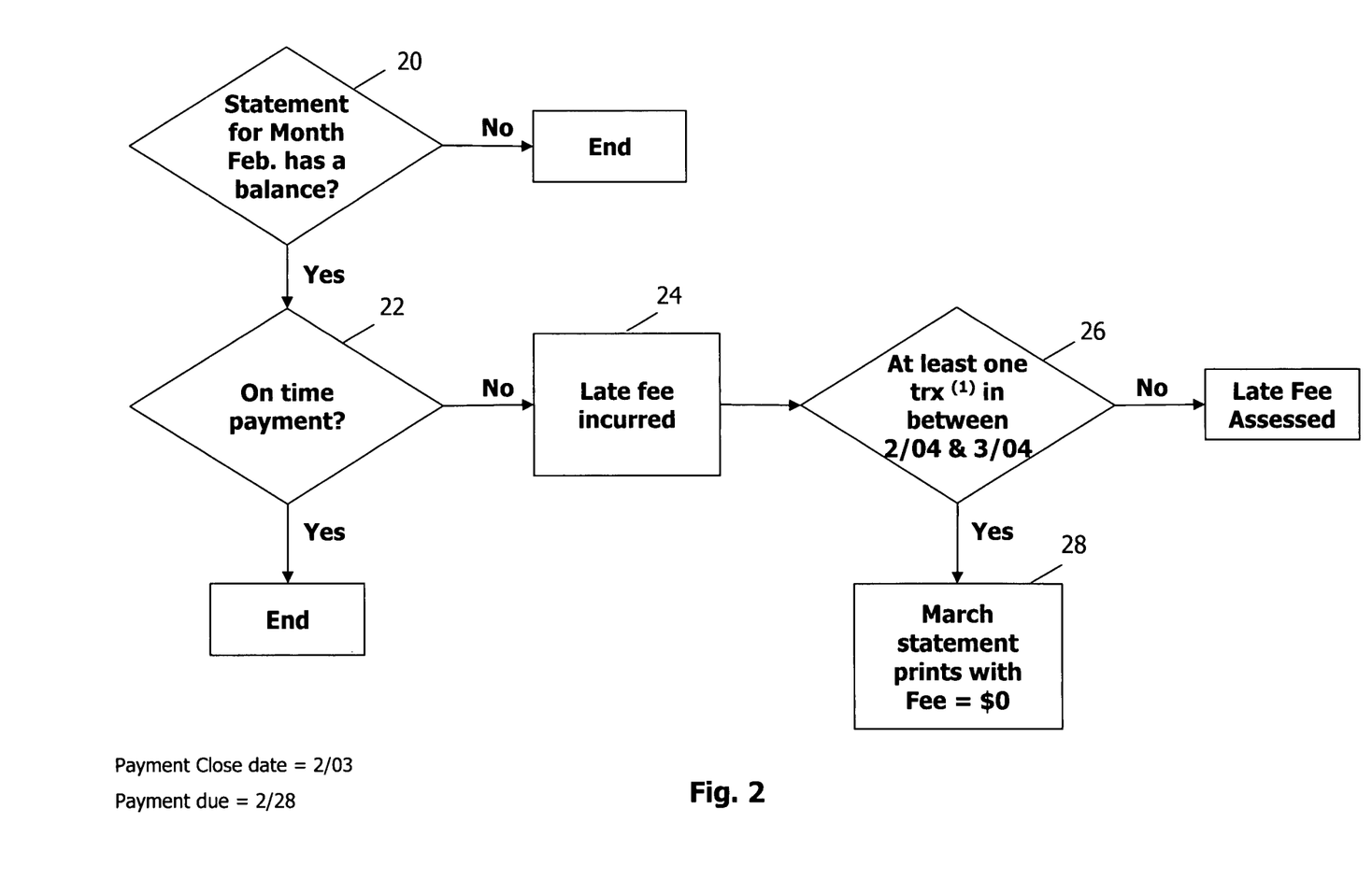
FIG. 2 is a schematic diagram that illustrates an example of the logic employed in the process of waiving a late fee for embodiments of the invention.
Figure 3:
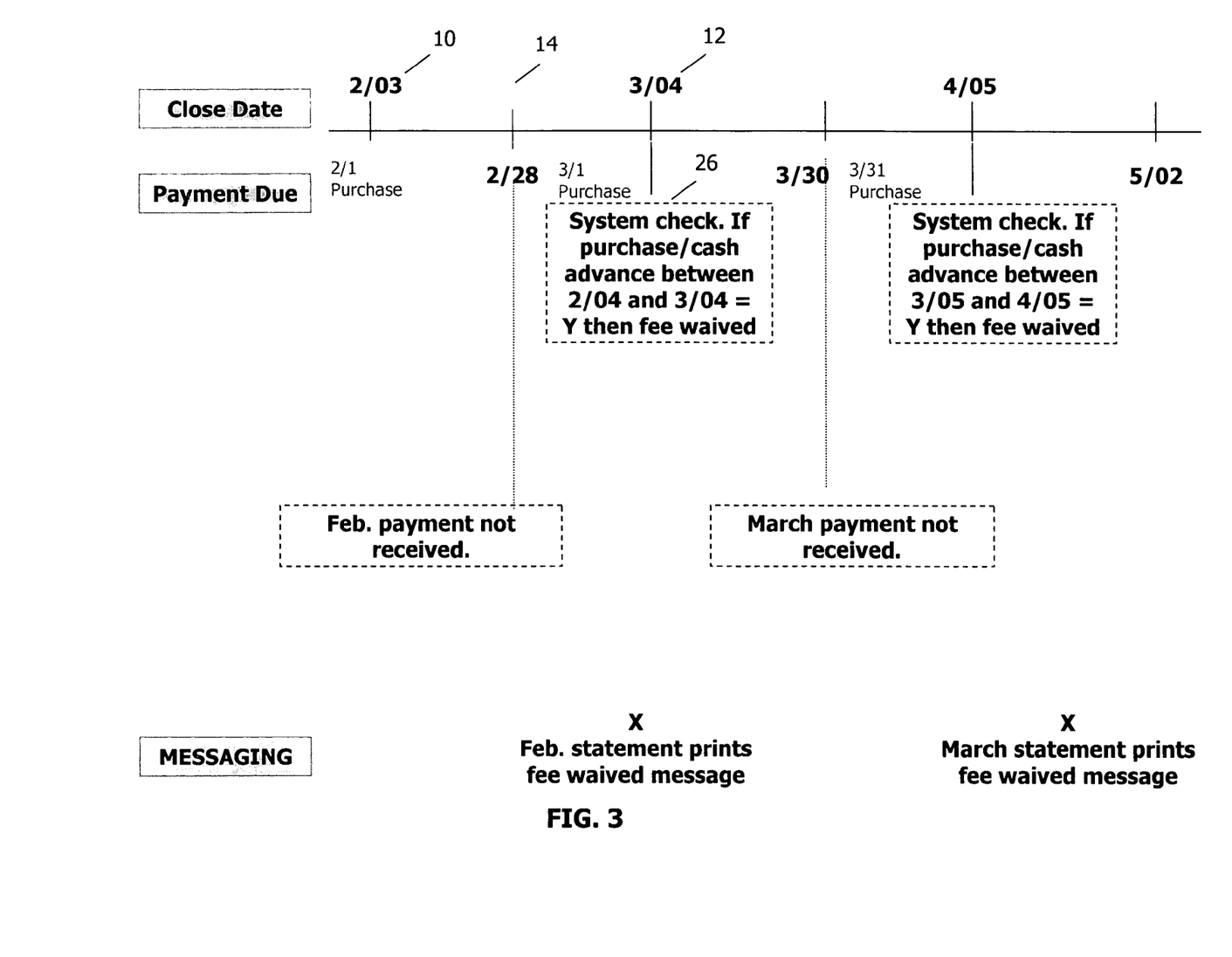
FIG. 3 is a timeline diagram that illustrates an example of employment of the logic illustrated in FIG. 2 for embodiments of the invention.

FIG. 1 is a flow chart that illustrates an example of the process of waiving a late fee for embodiments of the invention. Referring to FIG. 1, at S1, the financial institution provides a customer a transaction card account against which the customer can charge predetermined types of transactions during predefined account statement periods. At S2, a statement of charges against the account is sent to the customer by the financial institution at an end of each account statement period specifying a due date. At S3, if the statement is not paid by the specified due date, the financial institution conditionally assesses a predefined late fee on the account. At S4, if the customer made a charge against the account according to predefined parameters during a predetermined period of time, the financial institution waives the assessed late fee on the account FIG. 2 is a schematic diagram that illustrates an example of the logic employed in the process of waiving a late fee for embodiments of the invention. FIG. 3 is a timeline diagram that illustrates an example of employment of the logic illustrated in FIG. 2 for embodiments of the invention. Referring to FIGS. 2 and 3, the customer's statement cycles, for example, between February 3rd 10 and March $4^{th}$ 12, with a payment due date of February $28^{th}$ 14, as shown in FIG. 2. Referring further to FIGS. 2 and 3, if payment is not received from the customer by February $28^{th}$ 14, on or about March $4^{th}$ 12, as shown in FIG. 2, the system for embodiments of the invention checks at 20 to determine whether or not there was a balance on the statement that was due on February $28^{th}$ 14. If so, at 22, as shown in FIG. 3, the system for embodiments of the invention checks to determine whether or not the statement was paid on time. If so, a late fee is conditionally assessed against the customer's account at 24, as shown in FIG. 3. As shown in FIGS. 2 and 3, at 26, the system for embodiments of the invention checks to determine whether or not a purchase transaction or cash advance was charged against the customer's account between February 3rd 10 and March $4^{th}$ 12. If so, at 28, the conditionally assessed late fee is waived and a statement is printed for the customer's account showing the amount of the late fee that was waived as shown in FIG. 2.

In the VRU aspect of embodiments of the invention, when a customer calls customer service, the first response he or she hears is an automated welcome message that says, for example, "Welcome to [Financial Institution Cards] . . . please enter your 16 digit account number." At any time after the customer hears the welcome message, the customer can press "0" to be automatically placed into an answering queue for a live representative who, upon answering the call, says, for example, "Thank you for calling [Financial Institution Cards] customer service." The functionality specifically allows the customer, when calling customer service, to avoid the automated VRU and speak with a representative at any point during the call, including after requesting information from the automated VRU.

In today's world, a customer must typically go through several menus before he or she is given an option to speak with a live customer service representative. An embodiment of the invention eliminates that issue and gives customers that option immediately, which expedites the customer experience and gives customers a choice of how they want to interact with the financial institution over the phone. Thus, customers are allowed to speak immediately to a representative, or they can choose to use VRU. Although customers are given the option, it may be likely that many customers will continue to choose to use the VRU for many of their more routine requests. Nevertheless, an embodiment of the invention brings the option of going to a live representative to the front of the process for customers.

Embodiments of the invention involve, for example, providing a dedicated customer service unit, the members of which are provided special training for aspects, such as general voice tone, call opening, account number verification, account information accessing, customer name, lead to sale, offer description, customer problem, and end of call. Members of the dedicated customer service unit are trained to use an enthusiastic tone and to express energy and willingness to serve the customer and to initiate the call, for example, with "Thank you for calling the XXXXX customer service. My name is ________. May I have your name please? Thank you Mr < >. How may I help you with your YYYYY account today?" After the customer has explained his or her problem or question, the customer service representative is trained to start servicing the call by saying, for example, "I will be happy to take care of that for you".

Regarding the account number verification aspect for embodiments of the invention, the customer service representatives are trained not to ask for the account number if is not needed. For example, if the account number populates on the customer service representative's terminal, he or she will not have to ask the customer to repeat it. With regard to the account information accessing aspect for embodiments of the invention, the customer service representatives are trained to let the customer know that the financial institution cares about the customer's time by saying, for example, "Mr <>, I appreciate your patience", "Mr <>, thank you for holding", if it is taking time to access a customer's information. Regarding the customer name aspect for embodiments of the invention, the customer service representatives are trained, for example, to always refer to customers by their name at the beginning of the call.

With respect to the lead to sale aspect for embodiments of the invention, the customer service representatives are trained to transition to a sale, for example, with "As a XXXXX cardmember you might be interested in . . . ", if the customer is eligible for a sale, instead of phrases such as "You qualify for a . . . " or "I am not sure if you are interested in . . . ". Regarding the offer description aspect of embodiments of the invention, the customer service representatives are trained, for example, to explain the offer slowly without rushing. With regard to the customer problem aspect of embodiments of the invention, the customer service representatives are trained to express sympathy using phrases such as "I can understand that", "I am sorry . . . ", if customer has a problem with his or her account. With respect to the end of call aspect for embodiments of the invention, the customer service representatives are trained to close the call, for example, with "We appreciate your business, have a good <day/evening>" or "Thank you for using your XXXXX card, have a good <day/evening>" after finishing the call.

In addition, embodiments of the invention involve providing the members of the dedicated customer service unit with special training, for example, for start-of-call messages for customer service and new card activation related calls. The customer service representatives are trained to answer customer service related calls by saying, for example, "Thank you for calling XXXXX customer service. My name is . . . " With regard to card activation related calls, the customer service representatives are trained, after verifying that the card is activated, to use a message such as "I would like to welcome you to your new XXXX card. This card is designed to treat you right, like making it easier to speak to a live person, anytime for your customer service needs. As a XXXX cardmember, you might be interested in . . . "

A key feature of embodiments of the invention is the direct-to-representative aspect of the dedicated customer service unit. In the direct-to-representative aspect, upon calling the dedicated unit, the customer is asked to enter his or her account number into the voice response unit. The account number is then automatically passed from the voice response unit to the customer service representative, so the customer does not have to repeat the entire account number. Thereafter, the customer service representative asks for the customer's name as it appears on the card and verifies the customer's identity using standard verification procedures, such as the mother's maiden name, a password, or the like.

In the direct-to-representative aspect, customers hear an option to press '0' for a customer service representative as the first voice response prompt. If a caller is placed on hold he or she hears a standard hold messaging advising them to hold for the next available customer service representative. Warm transfer/internal transfer numbers are set up to go directly to a customer service representative in the dedicated unit, and the average speed of answer is, for example, 15 seconds, the same as other financial institution customer service standards. The 15 second period begins at the time the routing process begins at a customer service representative, either initiated by the customer or by transfer of the customer whose identity cannot be verified.

A toll-free number is provided for the dedicated customer service aspect of embodiments of the invention which points, for example, to an existing voice response unit application. The dialed number identification service utilizes functionality, such as prescreen, verification, and options with various exceptions and/or modifications. For example, a new greeting is created and used to greet customers who call the dedicated customer service unit toll-free number, and a unique main menu is provided for such customers. While the main menu offers options similar to other customer service options, the unique feature of the main menu for embodiments of the invention is the option to route to a customer service representative that is moved from last or near last place among menu options up to first place among the menu options.

Figure 4:
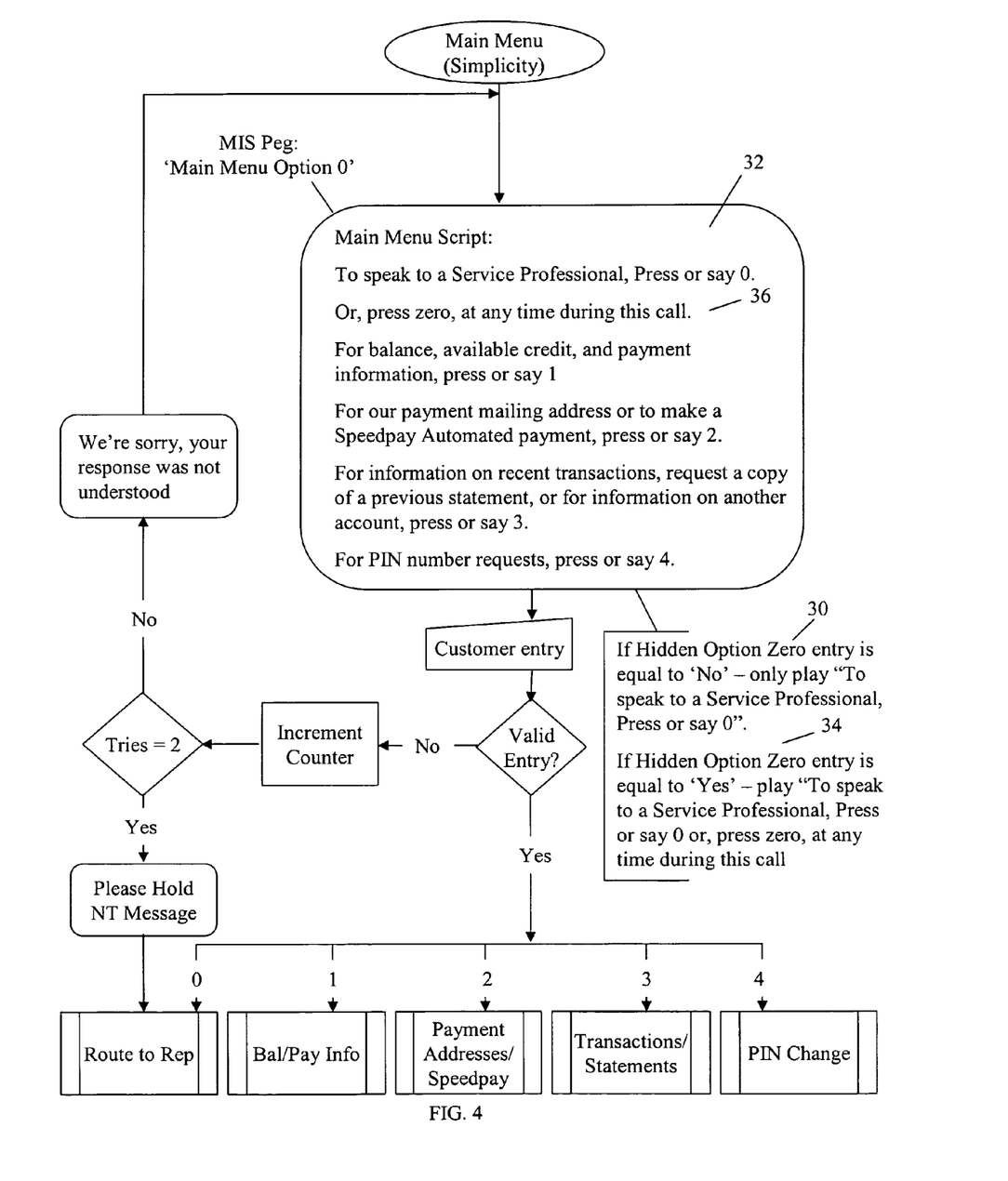
FIG. 4 is a schematic flow chart that illustrates an example of main menu call flow of the direct-to-representative aspect for embodiments of the invention.
Figure 5A:
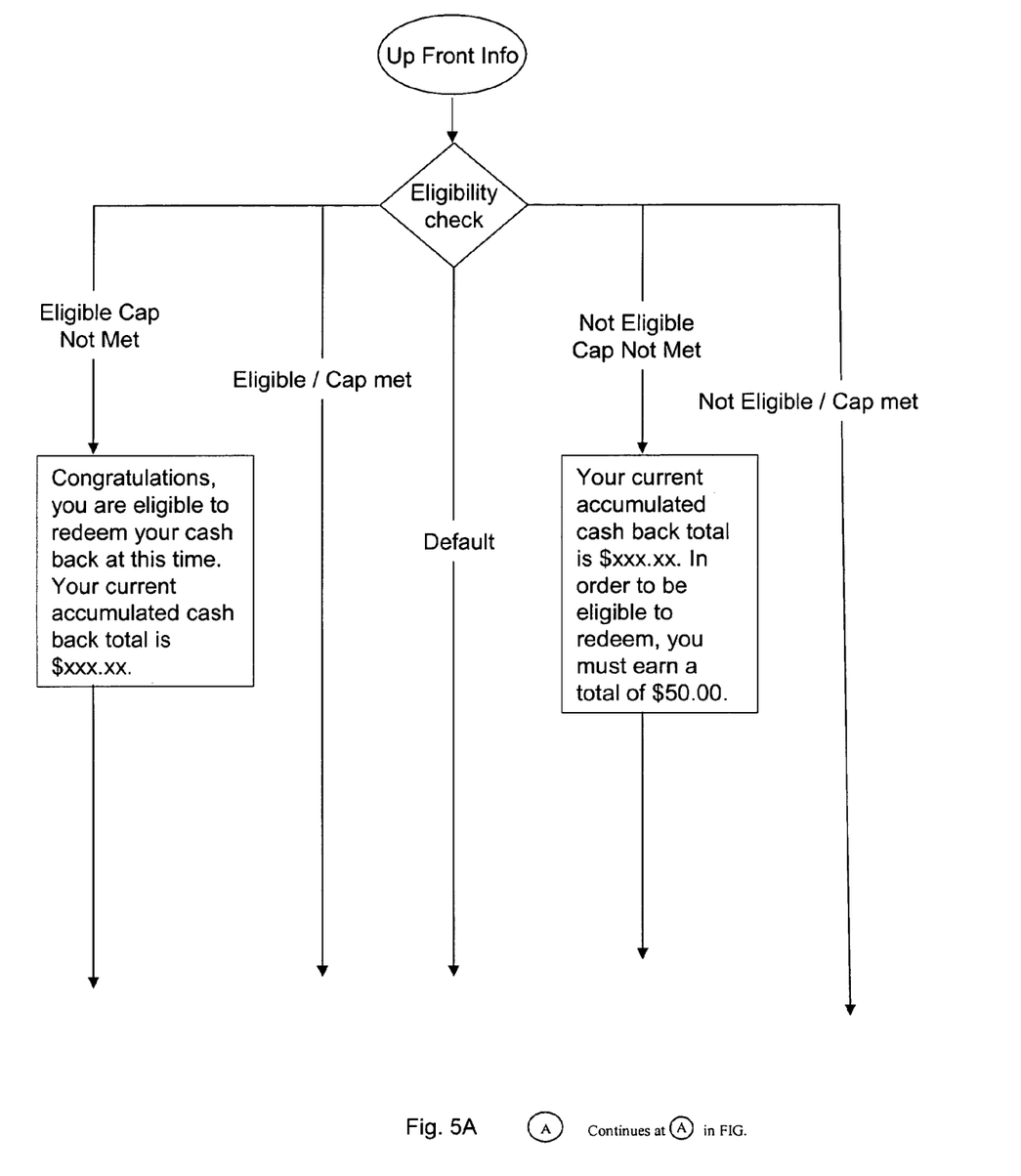
FIGS. 5A and 5B show a schematic flow chart that illustrates an example of rewards redemption call flow for embodiments of the invention.
Figure 5B:
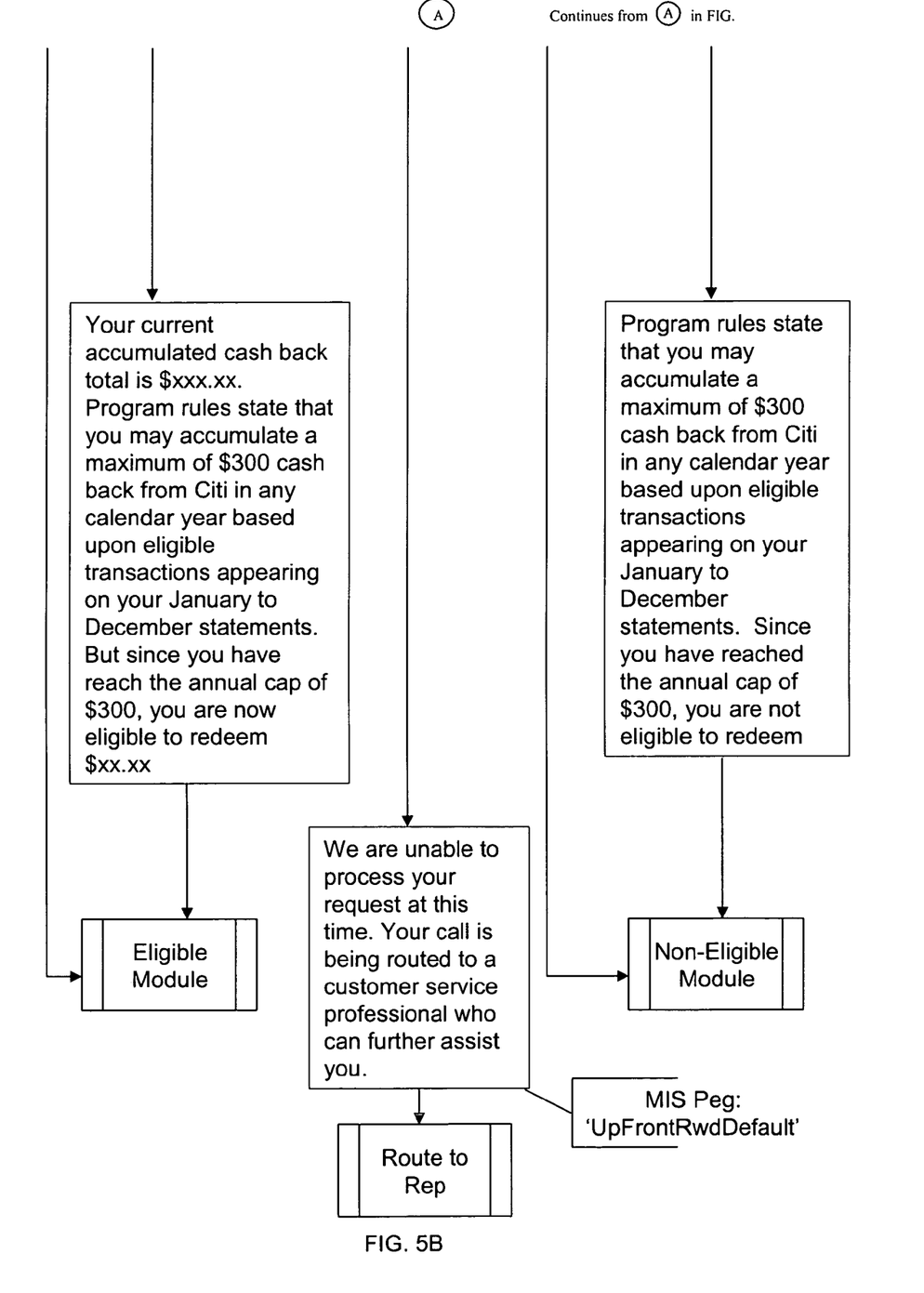

Embodiments of the invention also provide functionality to script or suppress hidden option zero prompts within the main menu based upon an entry for hidden option zero. FIG. 4 is a schematic flow chart that illustrates an example of main menu call flow of the direct-to-representative for embodiments of the invention. Referring to FIG. 4, for example, if the hidden option zero entry is equal to 'No' as shown at 30, only "To speak to a Service Professional, Press or say 0" is played, as shown at 32, but if the hidden option zero entry is equal to 'Yes', as shown at 34, "To speak to a Service Professional, Press or say 0 or, press zero, at any time during this call", as shown at 36, is played. A new greeting is likewise created and used to greet customers who call an existing rewards redemption toll-free number. FIGS. 5A and 5B show a schematic flow chart that illustrates an example of rewards redemption call flow for embodiments of the invention.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer implemented method for managing a transaction card account, comprising:
   providing, using a computer, a customer a transaction card account against which the customer can charge predetermined types of transactions during predefined account statement periods;
   providing, using the computer, a statement of charges against the transaction card account to the customer at an end of each account statement period specifying a due date;
   conditionally assessing, using the computer, a predefined late fee on the account if a statement is not paid by the specified due date; and
   waiving, by the computer, the conditionally assessed late fee on the account if the customer made a charge against the account according to predefined parameters during a predetermined period of time consisting of a statement period for which payment of the statement is due by the specified due date.

2. The method of claim 1, wherein providing the transaction card account further comprises providing the customer any of a basic card account, a rewards card account, and a cash card account.

3. The method of claim 1, wherein providing the transaction card account further comprises providing the customer the transaction card account against which the customer can charge purchase and cash advance transactions.

4. The method of claim 1, herein waiving the late fee further comprises waiving the late fee on the account if the customer made a charge for a purchase or a cash advance transaction against the account during the predetermined period of time.

5. The method of claim 1, wherein waiving the late fee further comprises waiving the late fee on the account if the customer made the charge for the purchase or the cash advance transaction against the account during the statement period for which the payment is due based on a date on which the purchase or cash advance transaction was posted to the account rather than on a date on which the purchase or cash advance transaction was made.

6. The method of claim 1, wherein waiving the late fee further comprises displaying an amount of the waived late fee on a succeeding statement of charges against the account which specifies that the late fee is waived.

7. The method of claim 4, wherein waiving the late fee further comprises waiving the late fee on the account if the customer made the charge for the purchase or cash advance transaction, excluding at least balance transfers, against the account during the predetermined period of time.

8. The method of claim 1, wherein waiving the late fee further comprises waiving the late fee on the account if the customer made the charge against the account during the predetermined period of time without limitation on a number or amount of waived late fees.

9. The method of claim 1, further comprising providing a voice response unit in a customer service operational area within the financial institution that allows the customer an option to opt out of a voice response unit scripted call and speak directly to a customer service representative about the account at any time during a call.

10. The method of claim 9, wherein providing the voice response unit further comprises providing the voice response unit which allows the customer to opt out of the voice response unit scripted call and speak directly to the customer service representative about the account by pressing "0" at any time during the call and being connected with a next available customer service representative.

11. The method of claim 9, wherein providing the voice response unit further comprises prompting the customer to enter the customer's account number into the voice response unit and passing the account automatically from the voice response unit to the customer service representative upon opting out of the voice response unit scripted call and to speak direct to the customer service representative by the customer.

12. The method of claim 9, wherein providing the voice response unit further comprises providing a voice response unit menu with a first menu option to route the customer to the customer service representative.

13. A machine for managing a transaction card account, comprising:

a computer having a microprocessor coupled to memory, wherein the microprocessor is programmed for:

providing a customer a transaction card account with a financial institution against which the customer can charge predetermined types of transactions during predefined account statement periods;

providing a statement of charges against the account to the customer at an end of each account statement period specifying a due date;

conditionally assessing a predefined late fee on the account if a statement is not paid by the specified due date; and waiving the conditionally assessed late fee on the account if the customer made a charge against the account according to predefined parameters during a predetermined period of time consisting of a statement period for which payment of the statement is due by the specified due date.

* * * * *